(12) United States Patent
Williamson (10) Patent No.: US 8,623,200 B2
(45) Date of Patent: Jan. 7, 2014

(54) GREY WATER FILTERING SYSTEM

(71) Applicant: David Williamson, Tucson, AZ (US)

(72) Inventor: David Williamson, Tucson, AZ (US)

(73) Assignee: Green Water Innovations, LLC, Tucson, AZ (US)

( * ) Notice: Subject to any disclaimer, the term of this patent is extended or adjusted under 35 U.S.C. 154(b) by 0 days.

(21) Appl. No.: 13/738,460

(22) Filed: Jan. 10, 2013

(65) Prior Publication Data

US 2013/0126402 A1 May 23, 2013

Related U.S. Application Data

(63) Continuation of application No. 12/462,413, filed on Aug. 3, 2009, now abandoned, which is a continuation-in-part of application No. 12/313,054, filed on Nov. 17, 2008, now abandoned.

(51) Int. Cl.
*C02F 1/00* (2006.01)
*E03B 1/04* (2006.01)

(52) U.S. Cl.
CPC .......... *E03B 1/042* (2013.01); *E03B 2001/045* (2013.01)
USPC .......... 210/87; 210/253; 210/257.1; 210/258

(58) Field of Classification Search
CPC ...................................................... E02B 1/042
USPC .................................. 210/87, 253, 257.1, 258
See application file for complete search history.

(56) References Cited

U.S. PATENT DOCUMENTS

| | | | | |
|---|---|---|---|---|
| 434,571 | A * | 8/1890 | Sargent | 210/90 |
| 3,193,100 | A * | 7/1965 | Broughton | 210/117 |
| 5,045,215 | A * | 9/1991 | Lamarre | 210/747.7 |
| 5,147,532 | A * | 9/1992 | Leek, Jr. | 210/97 |
| 6,379,539 | B1 * | 4/2002 | Ubelhor | 210/104 |
| 6,462,666 | B1 * | 10/2002 | Einck | 340/623 |
| 7,025,076 | B2 * | 4/2006 | Zimmerman et al. | 137/1 |
| 7,025,879 | B1 * | 4/2006 | Ticknor | 210/232 |
| 7,419,331 | B2 * | 9/2008 | Brochu et al. | 405/43 |
| 7,465,122 | B2 * | 12/2008 | Brochu et al. | 405/43 |
| 7,473,053 | B1 * | 1/2009 | Brochu et al. | 405/49 |
| 7,498,953 | B2 * | 3/2009 | Salser et al. | 340/870.02 |
| 7,500,805 | B1 * | 3/2009 | Brochu et al. | 405/43 |
| 7,504,964 | B2 * | 3/2009 | Brennan et al. | 340/870.02 |
| 7,514,010 | B2 * | 4/2009 | Salmon | 210/777 |
| 7,517,449 | B2 * | 4/2009 | Choi et al. | 210/136 |
| 7,534,070 | B1 * | 5/2009 | Urban | 405/51 |
| 7,537,707 | B2 * | 5/2009 | Criswell et al. | 210/765 |
| 7,539,533 | B2 * | 5/2009 | Tran | 600/509 |
| 7,539,581 | B2 * | 5/2009 | Swarztrauber et al. | 702/61 |
| 7,539,600 | B2 * | 5/2009 | Pfundlin et al. | 702/189 |
| 7,539,935 | B2 * | 5/2009 | Becker et al. | 715/234 |
| 2005/0056581 | A1 * | 3/2005 | Arguello | 210/258 |
| 2010/0018911 | A1 * | 1/2010 | VanZeeland | 210/86 |
| 2011/0052320 | A1 * | 3/2011 | Haese | 405/36 |

* cited by examiner

*Primary Examiner* — Terry Cecil
(74) *Attorney, Agent, or Firm* — J. Kenneth Hoffmeister; Merchant & Gould (57) ABSTRACT

A water filtering system having its components contained within a single housing. The filter system uses a first filter pair of filters which can be first manually isolated from the water flow; and a second pair of filters which can also be manually isolated from the water flow. The two pairs of filters operate in parallel, thereby allowing one pair to be isolated for cleaning/repair without having to curtail operation since the other pair of filters remain operational.

7 Claims, 9 Drawing Sheets

GREY WATER FILTERING SYSTEM

CROSS-REFERENCE TO RELATED APPLICATIONS

This application is a continuation of U.S. application Ser. No. 12/462,413, filed Aug. 3, 2009, now abandoned, which is a continuation-in-part of U.S. application Ser. No. 12/313,054, filed Nov. 17, 2008 now abandoned.

BACKGROUND

This invention relates to conservation in general and more particularly to filtering of the grey water prior to dispersal.

The demand for water is increasing and the general fresh water supply is not. Growth in agriculture, industry, household, and recreational uses have placed significant strains on the already limited fresh water supply Add to this the effects of pollution and the actual supply of available usable fresh water is dwindling while the world's population continues to grow.

Supplying this growing population has required a huge expenditure in infrastructure, pumping stations, and water treatment works. At the present time, estimates are that four out of every ten people live without improved sanitation and only about half of the world's population has a piped water supply to their home.

To expand the usefulness of this limited water supply, one approach has been to re-use water a second time. This is often referred to as grey water or sullage. Grey water is non-industrial wastewater generated from domestic (and sometime industrial) uses such as dish washing, laundry and bathing. Grey water comprises 50-80% of residential wastewater and includes all water from a residence except that from toilets.

Grey water is typically treated through the sewer system by the water treatment plants. Obviously, if grey water were used in a secondary manner, then the load upon the treatment plants would be reduced to only 20-50% of its current load, thereby reducing the costs for this part of the infrastructure.

Use of the gray water include such simple solutions as diverting the water to a garden for a residential application. Unfortunately, in an industrial setting such as motels and hotels, and resorts pumping the grey water to a "garden" is not feasible, but to their landscaping, ponds, and/or golf course is.

It is clear there is a need for an efficient and cost effective mechanism to conserve water by reusing as much as possible.

BRIEF SUMMARY

The invention is a gray water recycling system which uses a holding tank receiving waste water from a laundry facility. This invention is ideally suited for use in collecting and recycling the gray water from a laundry facility at a hotel or resort. Laundry water, when proper detergents are used, is easily recycled.

Also, since the invention's ideal application is from the laundry system, the invention is easily installed into existing facilities, thus eliminating the need to engineer the system into a building during the planning stage.

While the following description refers to the collection of grey water from a commercial enterprise, the invention is not intended to be limited to this one application, but, extends for residential and agricultural applications as well.

In the preferred embodiment, water from the laundry is deposited into a holding tank. The holding tank has a pump for drawing water from said holding tank, and, a float within said holding tank. The float senses the level of the water within the tank; thereby assuring that the tank is not run "dry" which may damage pumps and other mechanisms which are not designed to operate without a water float.

In this manner, the float is activated when a water level within said holding tank exceeds a pre-determined level. A minimal amount of water must exist within the holding tank for the system to operate.

The holding tank communicates with a pressure tank which contains an activation sensor. While the water within the holding tank is not under pressure, the pressure tank is used to assure that proper pressure is maintained for subsequent mechanisms, such as irrigation systems.

A pump draws water from the holding tank and provides this water, under pressure to the pressure tank. The pump filling and pressurizing the pressure tank is activated when pressure within said pressure tank falls below a predetermined level and the float within said holding tank indicates that a water level within said holding tank exceeds a pre-determined level. In this way, the pump is never activated unless there is both sufficient water within the holding tank and there is a need to bring the pressure within the pressure tank up to the desired range.

In the preferred embodiment, the system is based on a standard 100 room hotel. Typically the laundry water consumption of a hotel is in the range of 2500-5000 gallons per day (i.e. 70 loads a day at 60 gallons per load, yields 4200 gallons per day).

A valve at the laundry trough diverts the waste laundry water into a three inch line to a 1000 gallon holding tank which uses effluent filters to eliminate the suspended particles. While those of ordinary skill in the art recognize a variety of effluent filters, the preferred effluent filter is a PL-625 Effluent Filter from Polylok Inc. This filter is able to operate for an extended period before requiring any maintenance such as cleaning or replacement and has been found to remove fats, oils, and grease by as much as 60-98%.

Alternative filtration system utilize removable cartridges, thereby allowing the user to periodically replace or clean the cartridge.

The now filtered waste water is communicated to an underground 2500 gallon holding tank with an effluent pump and floats. The preferred effluent pump is commercially available from Ofrenco Systems Inc., commercially known as the P Series Effluent Pump.

The underground holding tank has an overflow drain communicating with the sewer. This prevents a malfunction in the system causing a leakage from the holding tank. In the preferred embodiment of the invention, a sensor is placed in the overflow drain so that should a malfunction occur, an operator is alerted.

The effluent pump communicates the filtered gray water to a 500 gallon pressure tank which is above ground. A controller senses the pressure within the pressure tank and the presence of gray water from the float within the holding tanks. The controller activates a pump to maintain the pressure within the pressure tank within a desired range of pressure if: (1) there is sufficient water within the holding tank; and, (2) the pressure within the pressure tank is not within the desired range.

The outlet of the pressure tank communicates with a time controlled irrigation box and valves to the hotel's irrigation system. In this manner, pressurized water is communicated to the existing irrigation system.

This water is useful for subsurface irrigation although surface irrigation is a simpler and preferred method of delivering water to the plants. Ideally, in the case of surface irrigation, a disinfectant is used. While those of ordinary skill in the art recognize a variety of disinfectants, some examples of disinfectants are:

a) Chlorination (gaseous chlorine, solid chlorine, and liquid chlorine);
b) Ozone; and
c) Ultraviolet light.

In the preferred embodiment of the invention, the holding tank, the pump, controller, and pressure tank is contained within a single housing, thereby allowing the system to be easily installed. This embodiment is particularly useful for retrofitting residential applications.

With the above invention, not only has the affect of providing irrigation for the hotel, but also reduces the load which must be handled by water district.

One aspect of the invention creates a water reservoir which uses a corrugated metal tube as its main body. Being constructed of corrugated metal, the resulting reservoir is extremely light, durable, and easily transported to the site for installation.

In general the preferred reservoir is created by the corrugated metal tube with a solid plate sealing one end and another solid plate sealing the other end. Ideally, the solid plates at the end of the metal tube are also made from corrugated steel so that the entire assembly is able to withstand the elements once installed in the ground.

The corrugated metal tube has an opening at the top on which is secured a collar. The collar extends upward to provide access to the interior of the reservoir for maintenance and cleaning.

Although the collar is ideally long enough to reach the surface, in one embodiment of the invention, a sleeve is used to match the specifics of the installation with a standard reservoir/collar assembly. In this embodiment, the sleeve slides over the collar and extends up to ground level. This embodiment only requires the modification of the sleeve, not the collar, to fit the specifics of the installation site.

To facilitate installation of the reservoir, in one embodiment of the invention, lift hooks, adapted to receive a cradle from a crane, are secured to the end plates. In another embodiment of the invention, a bar extends from one end plate to the other and is contained within the reservoir. The lift hook is secured to the bar and is accessible via the collar/opening in the top of the reservoir.

Inflow into the reservoir is provided via an opening located at the top of one of the end plates.

Outflow to irrigation or to discharge is accomplished via a pump which communicates via a pipe having an open end proximate to the bottom of the reservoir. In some embodiments of the invention, the outflow and the inflow openings to the reservoir are located at the end plates; in other embodiments, the outflow and inflow are via the top of the corrugated pipe, thereby allowing for easier access during installation and for maintenance purposes.

A sensor or float is used to monitor the amount of grey water contained within the reservoir. The amount of grey water within the reservoir assists in defining how the collected grey water is handled.

Ideally, the reservoir is also equipped to receive water treatment chemicals. This injection is ideally done at the top of the corrugated pipe, although other embodiments an opening the end plates allows entry of these chemicals. This allows the periodic treatment of the contained grey water to eliminate pathogen growth.

Treatment mechanisms and chemicals are well known to those of ordinary skill in the art, including, but not limited to those described in U.S. Pat. No. 6,379,539, entitled "Point of Entry Water Treatment System" issued to Ubeihor on Apr. 30, 2002; and, U.S. Pat. No. 7,537,707, entitled "Gas Injector and Method Therefor" issued to Criswell et al. on May 26, 2009, both of which are incorporated hereinto by reference.

Although the above discussion on the reservoir relates to the preferred reservoir, the invention is not so limited and is intended to other reservoirs well known to those of ordinary skill in the art. Examples of such alternative reservoirs include: U.S. Pat. No. 7,025,879, entitled "Rainwater Collection Apparatus and Pumping System" issued to Ticknor on Apr. 11, 2006; and, U.S. Pat. No. 7,025,076, entitled "Rainwater Recovery System" issued to Zimmerman Jr. et al. on Apr. 11, 2006, both of which are incorporated hereinto by reference.

Within the preferred embodiment of the invention, the grey water is filtered before its use for irrigation purposes. Ideally the water filtering system has its components contained within a single housing. The housing is used to contained a pre-fabricated group of systems so that installation is easier to accomplish, overall expense of production is reduced due to mass production, and a uniform mechanism is created.

Contained with the housing is a filter system ideally uses two pairs of filters. Each pair uses a first filter to remove large particles which are suspended in the grey water and a second filter for a finer cleansing of the grey water.

Those of ordinary skill in the art readily recognize a variety of filter mechanisms, including, but not limited to: U.S. Pat. No. 7,517,449, entitled "Water purification Filter Easily Replaced by Connector and Water Purification System Using the Same" issued to Choi et al. on Apr. 14, 2009; and, U.S. Pat. No. 7,514,010, entitled "Water Filtering Method and Apparatus" issued to Salmon on Apr. 7, 2009, both of which are incorporated hereinto by reference.

By using redundant pairs of filters, replacement/maintenance of the filter mechanisms or cartridges is easily accomplished without taking the entire system off line. The redundant systems operate in parallel allowing either pair to be isolated from the water flow during the maintenance task.

Isolation of either filter pair is accomplished through a variety of mechanisms such as a manually operated valve located at the inflow to the filter pair and another manually operated valve located at the outflow of the filter pair. In another embodiment, instead of a manually operated valve at the outflow, an anti-syphon valve (allowing water to flow only in one direction, away from the filters) is used. This prevents back-flow to enter the filter pair.

Ideally, also contained within the housing is a flow meter which monitors the flow of grey water through the filters together with a solenoid valve allowing the mechanism to be "opened" or "closed" by a remote computer or controller.

In some embodiments of the invention, the housing also contains a pump and a pressure vessel for the movement of the grey water through the filter housing.

At the local level, a controller is used to monitor and adjust the operation of the local system. Ideally this controller is a Programmable Logic Controller which provides sufficient capability to both monitor/control the local system but also to report to a remote computer as described later to control the dispersal of the grey water.

The controller receives a signal from a water sensor at the reservoir indicating the level of grey water within the reservoir. This signal is communicated to a remote computer.

When an activation signal from the remote computer is received, the programmable logic controller activates a pump to deliver the grey water to an irrigation system. Ideally this irrigation system extends to plants on the site where the grey water is collected, such as a hotel or convention center; in other embodiments, irrigation is also conducted at remote sites such as neighboring businesses, houses, or public works.

The controller is also able to control a valve which directs the grey water to a disposal system when the reservoir becomes overfilled and there isn't any need for irrigation. In this case, the remote computer instructs the controller to open the disposal valve and activate the pump so that a portion of the collected grey water is sent to a disposal system.

Those of ordinary skill in the art readily recognize a variety of programmable logic controllers; another such acceptable controller is described in U.S. Pat. No. 7,539,581, entitled "System and Method for On-Line Monitoring and Billing of Power Consumption" issued to Swarztrauber et al. on May 26, 2009, incorporated hereinto by reference.

Disposal of excess collected grey water is accomplished by either discharge into the established sewer system or through leaching fields located at the collection property's site.

In the preferred embodiment, the grey water disposal system is ideally placed below a parking lot. This placement works well for the hotel or resort application as there are typically large parking lots associated with them.

Water flow chambers are positioned beneath said parking lot. These water flow chambers are typically concave with a solid upper surface and being open at the bottom. This configuration provides for a large leaching surface and maximal structural support so that the chamber does not collapse due to the weight from vehicles above.

Those of ordinary skill in the art readily recognize a variety of mechanisms used in this context, including, but not limited to: U.S. Pat. No. 7,500,805, entitled "Low-Nest Height Thermoplastic Leaching Chamber" issued to Brochu et al. on Mar. 10, 2009; U.S. Pat. No. 7,473,053, entitled "Arch Shape Cross Section Chamber Having Corrugations with Flattened Web Segments" issued to Brochu et al. on Jan. 6, 2009; U.S. Pat. No. 7,465,122, entitled "Leaching Chamber Having High Leaching Area to Weight Ratio" issued to Brochu et al. on Dec. 16, 2008; and U.S. Pat. No. 7,419,331, entitled "Leaching Chamber with Varying Slot Opening Height" issued to Brochu et al. on Sep. 2, 2008, all of which are incorporated hereinto by reference.

Pipes communicate the grey water into the water flow chambers for leaching into the soil.

In one embodiment, the water flow chambers are configured with at least two legs. Pipes to these legs deliver the grey water to different locations within the chambers. In this way, the programmable logic controller discussed above is able to direct the grey water to different locations with the network of water flow chambers to reduce or eliminate any ground saturation and subsiding of the soil due to the discharge of grey water. As example, the grey water is dumped into the network at location "A" for a few days; then location "B" for another period; then to location "C" for a period of time; and then finally back to location "A" within the network. By the time that water is dumped at location "A" again, all of the prior grey water dumped at the site has leached into the soil, thereby providing a "dry" location again.

In some embodiments of the invention, sensors are positioned at the end of each pipe where the grey water is dispensed withing the network. These sensors communicated with the Programmable Logic Controller discussed above so that the Controller is able to select a site within the network which is "dry" for the disposal of the grey water.

In some embodiments, vents are also provided within the network allowing the placement of chemicals within the network. These chemicals can be to control pathogens or to dissuade root growth so as to maintain the integrity of the network.

An important aspect of the present invention is its ability to monitor and control numerous locations from a central hub. Each of the local systems as described above communicates with a central computer so that the status of each locale is known; and the central computer provides directions as to the operation of each locale's controller.

This communication is accomplished through a variety of mechanisms well known to those of ordinary skill in the art, including cell telephone communications and Internet messaging. Additional techniques are described in: U.S. Pat. No. 7,539,935, entitled "Method for Transmission of a Process Valve and Control System" issued to Becker et al. on May 26, 2009; and, U.S. Pat. No. 7,539,600, entitled "Transmitter" issued to Pfundlin et al. on May 26, 2009, both of which are incorporated hereinto by reference.

The central control computer selectively disburses grey water at each of the locales as defined by its own operating system and the data received from each locale. Any number of computers are obvious to those of ordinary skill in the art, together with the systems described in: U.S. Pat. No. 7,539,533, entitled "Mesh Network Monitoring Appliance" issued to Tran on May 26, 2009; U.S. Pat. No. 7,504,964, entitled "Communications and Features Protocol for a Measuring Water Meter" issued to Brennan et al. on Mar. 17, 2009; and, U.S. Pat. No. 7,498,953, entitled "Smart Transmitter for Utility Meters" issued to Salser Jr. et al. on Mar. 3, 2009, all of which are incorporated hereinto by reference.

This central computer is able to direct the remote locales to: irrigate plants at the locale; irrigate plants remote from the locale (such as neighboring businesses or residential areas); or to discharge the grey water into a disposal system.

In making these decisions, the central computer uses not only data from the locale but also information from another computer, such as a bank's computer, which reports on whether payment for services/grey water has been received on time or not.

The central computer also produces reports on the amount of grey water being captured and how it is being used together with a statement/invoice for the services being provided.

The invention, together with various embodiments thereof, will be more fully explained by the accompanying drawings and the following descriptions thereof.

DRAWINGS IN DETAIL

Figure 1:
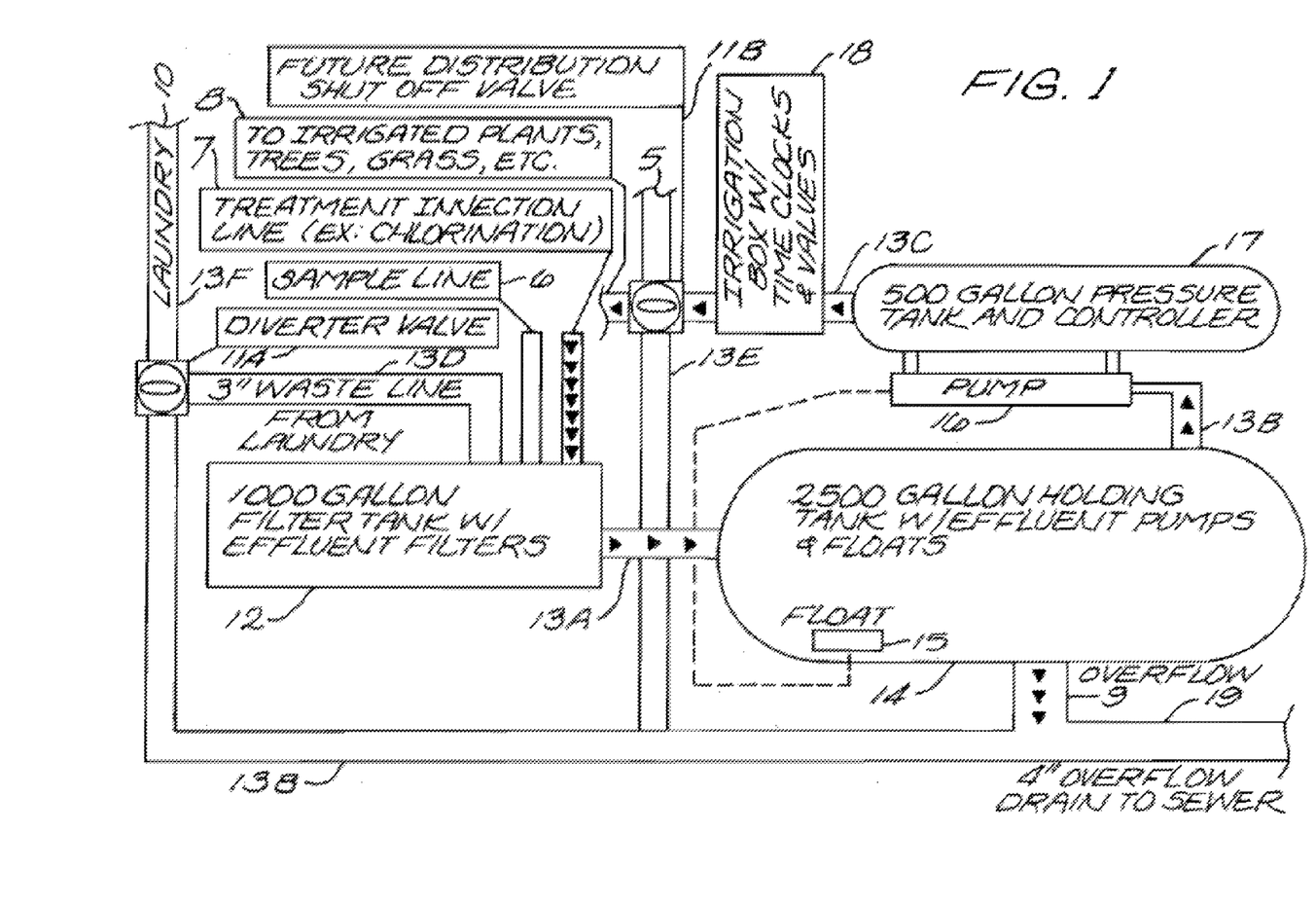
FIG. 1 is a block diagram illustrating the operation of the gray water treatment system.

FIG. 1 is a block diagram illustrating the operation of the gray water treatment system.

Gray water from laundry 10 is communicated via pipe 13F to diverter valve 11A. Diverter valve 11A is used to connect/disconnect the gray water with the system by either directing the gray water flow to pipe 13D (connecting the gray water to the treatment system) or directing the gray water flow to pipe 13E (thereby flushing the gray water into the sewer 19).

The gray water flows through pipe 13D to the filter tank 12 which removes the suspended particles from the gray water and then communicates the now filtered gray water via pipe 13A to holding tank 14. Float 15 within holding tank 14, determines if the gray water within holding tank 14 exceeds a minimal level.

An overflow 9 communicates with holding tank 14 and directs any excess water to the sewer 19. This prevents the system from becoming overwhelmed by the incoming gray water.

Pump 16 draws the gray water from holding tank 14 via pipe 13B and pressurizes pressure tank 17. Pump 16 is activated when there is at least minimal water within holding tank 14 (as defined by float 15) and the pressure within pressure tank 17 is not within a prescribed range.

The pressurized gray water is communicated via pipe 13C to the irrigation box 18 which is equipped with a time to properly dispense the irrigation to the plants. Shut off valve 11B allows the irrigation system to dispense water either to the plants 8 or to be flushed to the sewer 19 via pipe 13E or pipe 9 to an expanded future distribution area 5. In some situation, the gray water needs to be treated. In those situations, an injection line 7 is used for the placement of chlorine or such into the tank housing the filters.

Additionally, sample line/portal 6 permits the gray water to be periodically tested.

In this manner, the entire system permits the laundry water to be collected, filtered, and pressurized for delivery to the irrigation system.

Figure 2:
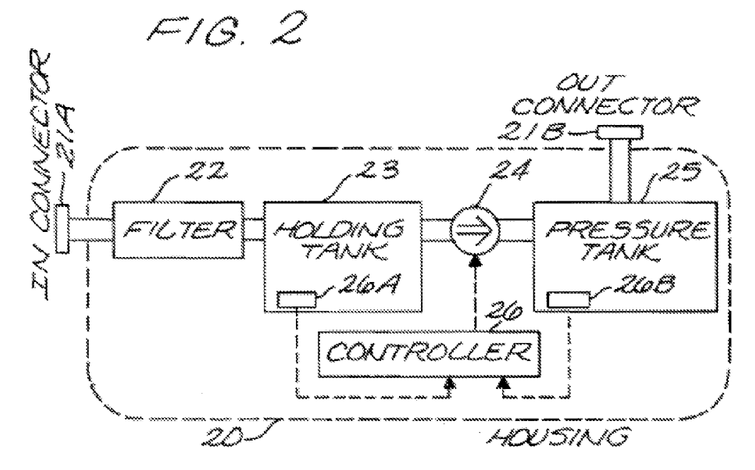
FIG. 2 is a block diagram illustrating the preferred residential embodiment of the gray water treatment system.

FIG. 2 is a block diagram illustrating the preferred residential embodiment of the gray water treatment system.

Housing 20 contains the entire gray water system. The system receives the untreated gray water via In connector 21A and delivers pressurized and filtered gray water to Out connector 21B.

The incoming gray water is first filtered by filter 22 to remove suspended particles. The filtered gray water is stored in holding tank 23. In this embodiment, for a residential application, holding tank 23 has sufficient capacity to contain a typical week's volume of laundry water from a residence (typically 200 gallons).

Pump 24 is activated by controller 26. Controller 26 activates pump 24 when sensor 26A indicates that gray water is within holding tank 23 and sensor 26B indicates that the water pressure within pressure tank 25 is not within the prescribed range.

The pressurized gray water is communicated to Out Connector 21B from the pressure tank 25.

This embodiment, being contained within a single housing, is easily manufactured and then is simply connected to an existing residential system. This embodiment is also enlarged/expanded to a motel or hotel for a residential unit subdivision having 100-150 units.

Figure 3:
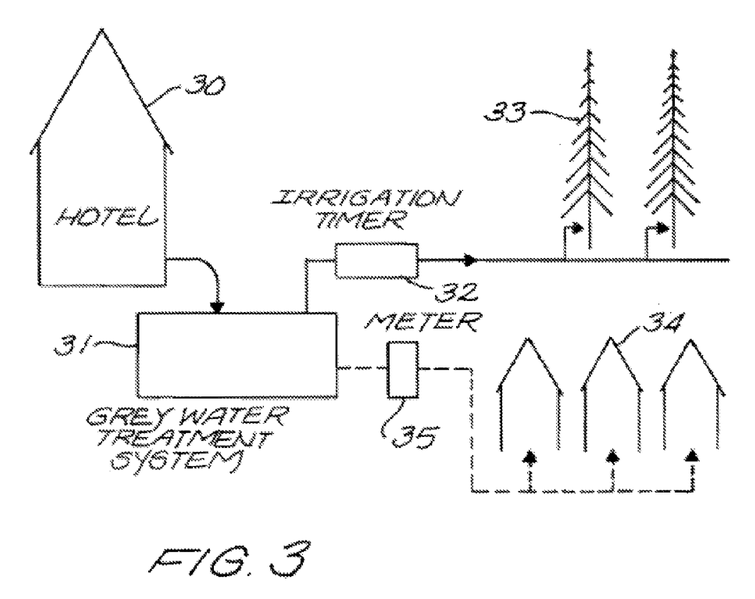
FIG. 3 is a block diagram illustrating the gray water treatment system implemented in a hotel setting.

FIG. 3 is a block diagram illustrating the gray water treatment system implemented in a hotel setting.

Hotel 30 produces a great volume of gray water from its laundry facility. This gray water is communicated to the gray water treatment system 31 as outlined above and the pressurized gray water is delivered to the irrigation system/timer 32 which delivers the gray water to the landscape 33.

In an alternative embodiment of the invention, the filtered and pressurized gray water is delivered to neighborhood 34, thereby permitting the neighborhood to benefit from the water being generated by hotel 30. In this embodiment, ideally a meter 35 determines the amount of grey water being delivered to the neighborhood either for billing purposes to the neighborhood or to computer any credit which the local water district may provide for recycling grey water.

Figure 4A:
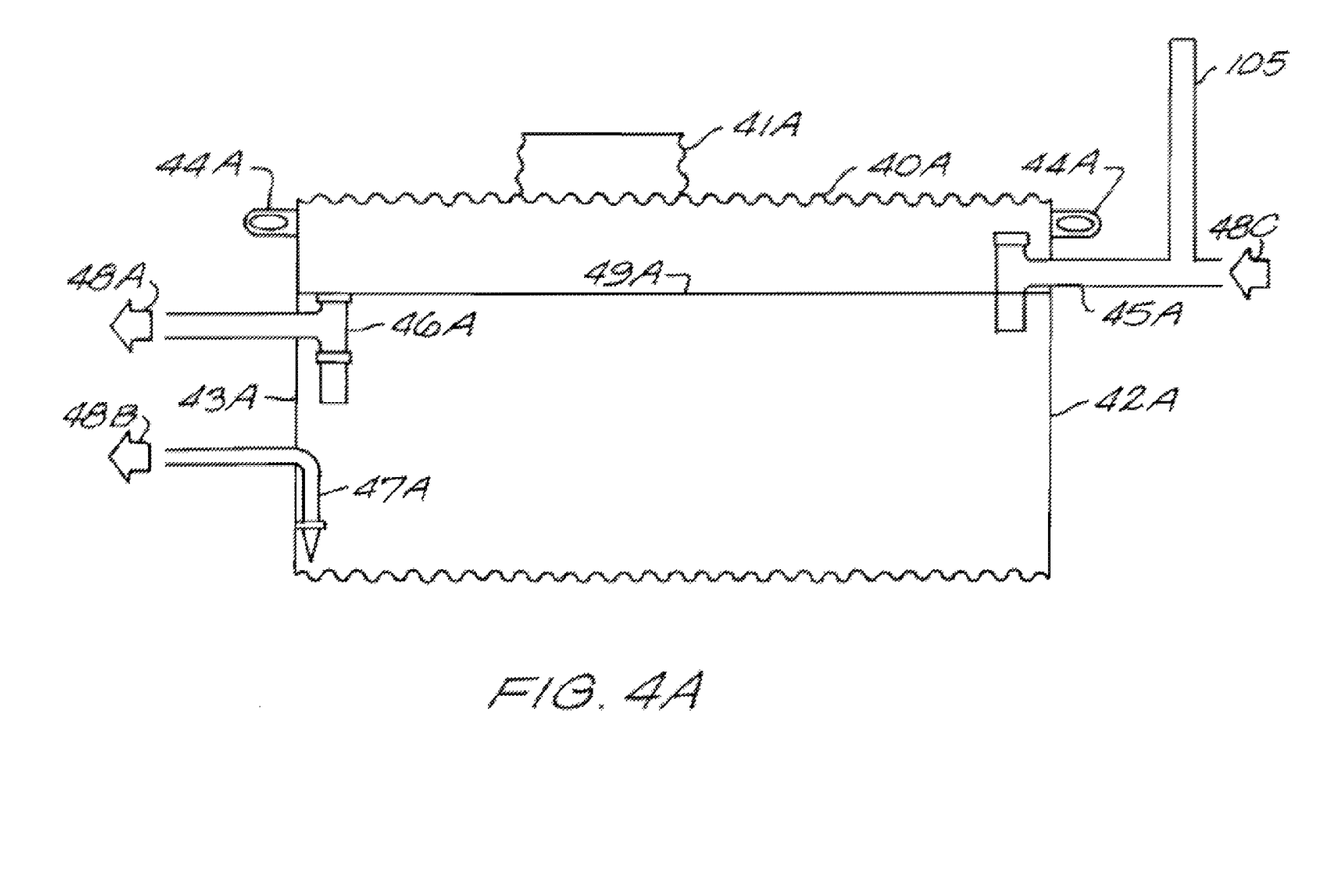
FIGS. 4A and 4B illustrate two embodiments of the reservoir used in the preferred embodiment.
Figure 4B:
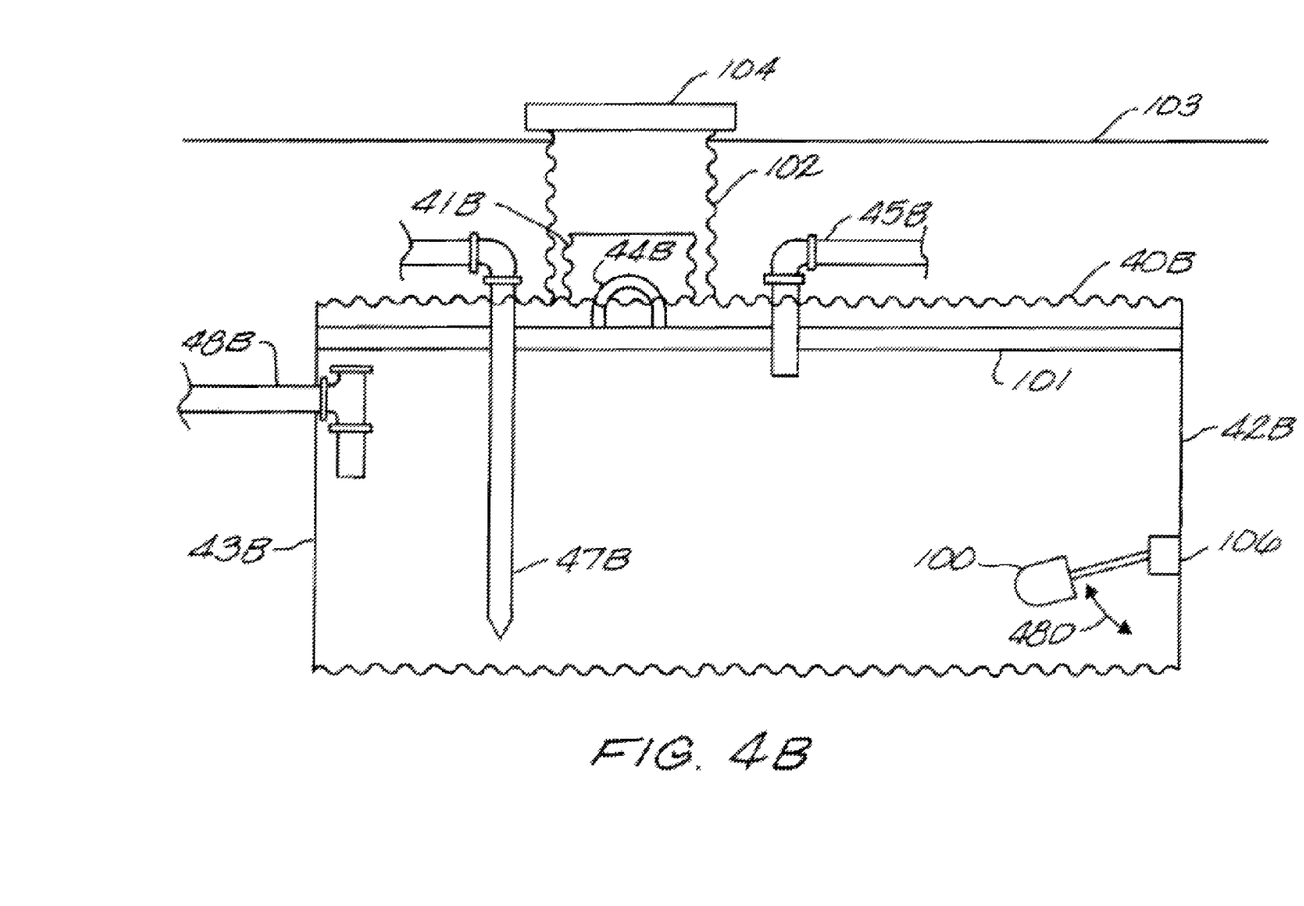

FIGS. 4A and 4B illustrate two embodiments of the reservoir used in the preferred embodiment.

Referring to FIG. 4A, corrugated steel tube 40A has a top opening communicating with collar 41A. The interior of the corrugated steel tube 40A is sealed by solid end plates 42A and 43A, thus forming a reservoir for the grey water.

In-flow of the grey water into the reservoir is via pipe 45A as illustrated by arrow 48C. The grey water so collected is contained until a height 49A is reached, at which level, the grey water is naturally discharged via over-flow outlet 46A as illustrated by arrow 48A.

Outlet pipe 47A communicates with a pump, not shown, as illustrated by arrow 48B. This out-flow via outlet pipe 47A permits the grey water to be pump to irrigation sites as outlined above and explained further below.

Treatment pipe 105 extends upward to the surface level and assists in the placement of chemical treatments into the reservoir.

Hooks 44A are positioned on solid end plates 42A and 43A and assist in the placement of the reservoir into the ground.

FIG. 4B illustrates an alternative embodiment of the invention. Corrugated steel tube 40B is sealed using end plates 42B and 43B to form a reservoir for the collected grey water.

In this embodiment, float sensor 100 is placed within the reservoir to monitor the minimum volume of grey water which can be used for irrigation purposes and is activated by movement of the float as indicated by arrow 48D. Signals from float sensor 100 are communicated to a controller (not shown) via connection 106.

In this embodiment, the in-flow of grey water is at the top of the reservoir via pipe 45B. Overflow pipe 48B assures that the reservoir does not become over-filled.

A pump (not shown) pulls from pipe 47B which exits the reservoir at the top; thereby providing easier connection during installation.

Lift bar 101 is secured to the solid end plates 42B and 43B. Hook 44B is used to install the reservoir and is accessible via collar 41B.

In this embodiment, sleeve 102 is used to engage around collar 41B, thereby allowing the reservoir to be placed at a greater depth into the soil below ground level 103. Man-hole cover 104 engages sleeve 102 at ground level 103.

Figure 5A:
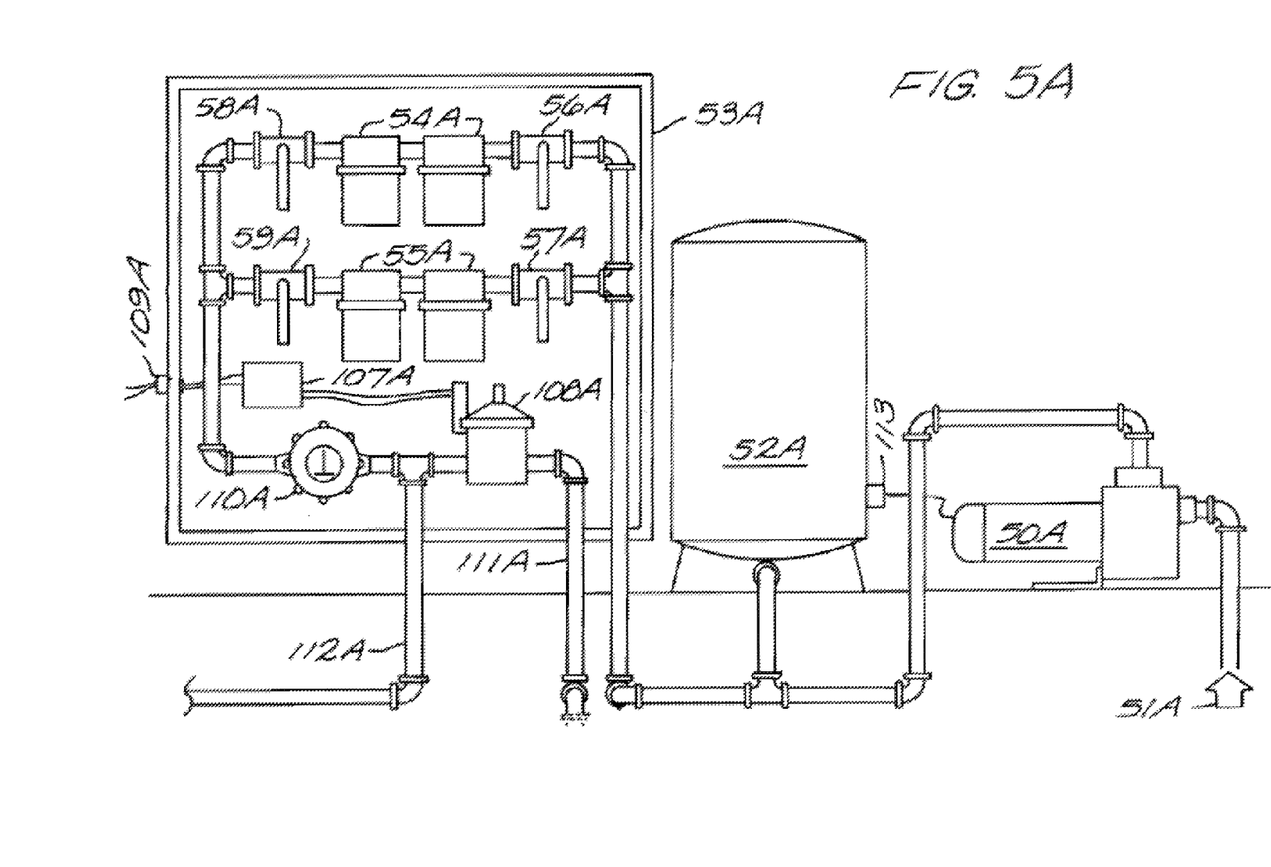
FIGS. 5A and 5B illustrate the preferred embodiment and an alternative embodiment of the filtering mechanism.
Figure 5B:
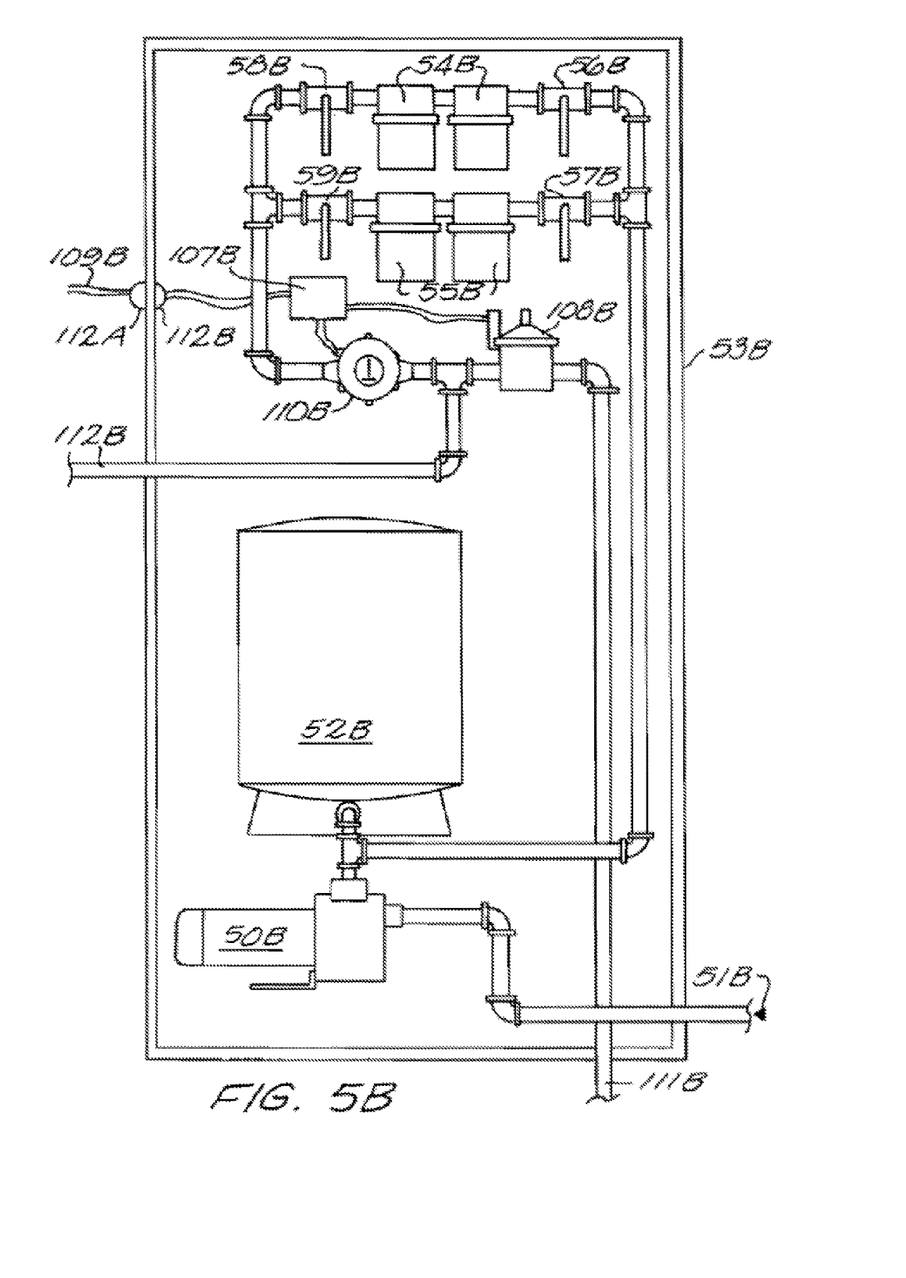

FIGS. 5A and 5B illustrate the preferred embodiment and an alternative embodiment of the filtering mechanism.

The preferred filtering embodiment is shown in FIG. 5A. Grey water is drawn by pump 50A as illustrated by arrow 51A. The grey water is communicated to pressure tank 52A and also to housing 53A wherein lies the filtering and metering mechanisms. A pressure sensor 113 is employed by tank 52A and is used to control pump 50A so that a predefined pressure level is maintained within the system.

Within housing 53A, the water enters and is communicated to redundant filter pairs 54A and 55A. These redundant filter groups 54A and 54B allow the system to remain in operation when the filters are being cleaned or changed. To clean or change a filter, a particular filter pair is isolated from the water flow, thereby leaving the other filter pair in operation.

As example, when valve 56A is closed, anti-syphon valve 58A prevents the grey water from back flowing into filters 54A, thereby isolating filters 54A and allowing maintenance to be performed. In like fashion, when valve 57A is closed, anti-syphon valve 59A prevents any back-flow so that maintenance is easily performed on filters 55A.

Also contained within housing 53A is meter 110 which, in this embodiment, is periodically read so that proper billing of the customer can be made. Pipe 112A communicates with an irrigation system (not shown).

In some situations, the grey water is discharged to waste, in which case, a remote computer communicates with controller 107A via line 109A. Controller 107A is able to open/close solenoid 108A to selectively discharge the grey water to waste via pipe 111A.

FIG. 5B illustrates another embodiment of the filtering system. In this embodiment, housing 53B contains the entire mechanism, thereby allowing the uniform manufacture and installation of the filter/pressure system.

Grey water is pulled by pump 50B, as illustrated by arrow 51B, from the reservoir (not shown). Pump 50B, as controlled by a pressure switch located within pressure tank 52B and provides the grey water under pressure to the parallel filter groups 54B and 55B.

For maintenance of filter group 54B, manually activated valve 56B and 58B are closed, thereby isolating filter group 54B. In similar fashion, filter group 55B is isolated when manually valves 57B and 59B are closed.

A remote computer (not shown) 109B communicates via electrical connector 112A and 112B with controller 107B. Controller receives usage signals from meter 110B and communicates these to the remote computer 109B. Remote computer 109B also directs controller 107B on the activation of solenoid valve 108B.

When solenoid valve 108B is open, the grey water is discharged to a disposal system via pipe 111B; otherwise, the grey water is communicated to irrigation 112B.

Figure 6:
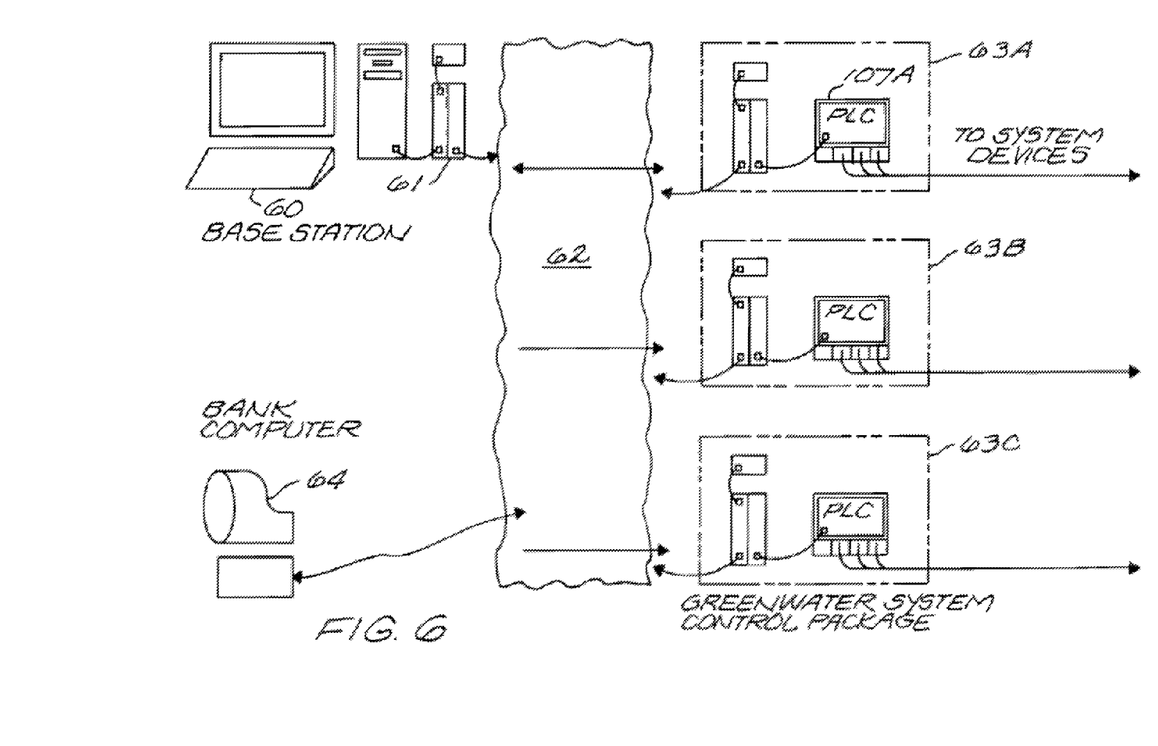
FIG. 6 is a block diagram of the distributed system of the present invention.

FIG. 6 is a block diagram of the distributed system of the present invention.

Base station 60 provides the centralized control of the distributed grey water systems. These grey water systems 63A, 63B, and 63C can be placed anywhere in the world. In this preferred embodiment, base station 60 communications via an ethernet/modem 61 into a network system 62. Network system 62 is any distributed networking system such as a phone network or the Internet.

Control statements are communicated from the base station 60 via the network system 62 to the various distributed grey water systems 63A, 63B, and 63C, described above. Each of the grey water systems uses a local Programmable Logic Controller 107A or other type of controller to direct operations at the local level. Additionally, the Programmable Logic Controller 107A also collects local data and communicates it to the base station 60 via the network system 62.

Base station 60 also uses data from a bank computer 64 to monitor if payment has been received from the customers being served by the grey water systems 63A, 63B, and 63C. The payment information is used to determine if the grey water is to be used for irrigation purposes or should be discharged to a waste disposal system.

By using a base station 60, overall operation is centralized and regimented while reducing the operating costs of the entire operation.

Figure 7:
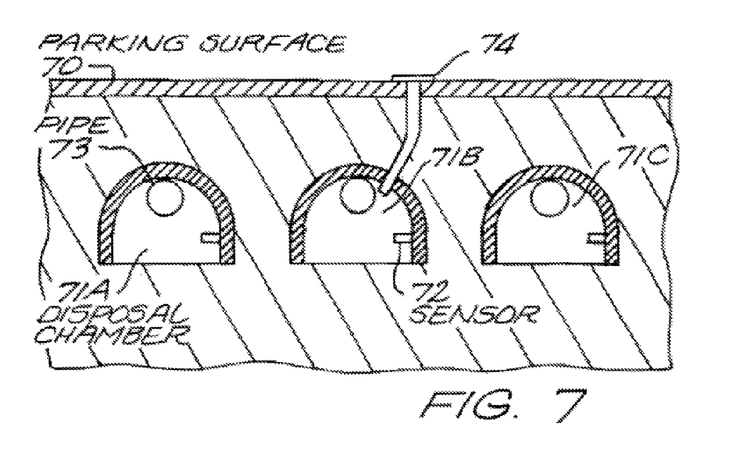
FIG. 7 is a cross sectional diagram of the preferred mechanism for the disposal of excess grey water.

FIG. 7 is a cross sectional diagram of the preferred mechanism for the disposal of excess grey water.

Constructed below parking surface 70 are different legs of the disposal system 71A, 71B, and 71C. Each of the systems has a rigid upper surface and is open at the bottom allowing the grey water to seep into the soil for disposal.

These disposal systems 71A, 71B, and 71C are equipped in the preferred embodiment with a discharge pipe 73 which is used to communicate the grey water together with a sensor 72. The sensor 72 is used by the Programmable Logic Controller (not shown) in determining where the grey water should be discharged using the different pipes. By monitoring the grey water conditions within a particular disposal system, saturation of the ground is prevented because the grey water is rotated into a new, dry disposal system.

Vent 74 is used to not only vent gasses within the disposal system but also provides an access into the disposal system for the placement of chemicals to either assist with the absorption of the grey water into the soil or to dissuade the growth of roots from nearby plants.

Figure 8:
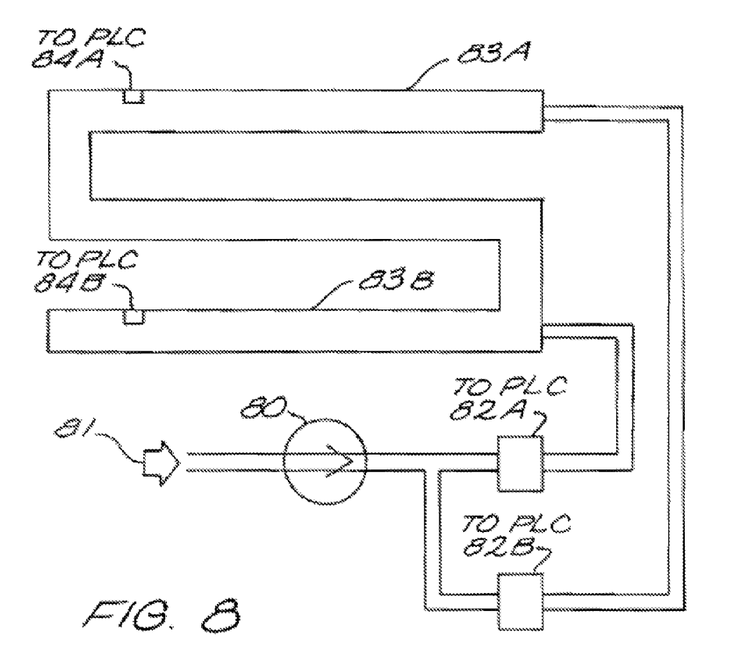
FIG. 8 is a top view of the grey water disposal system of the preferred embodiment.

FIG. 8 is a top view of the grey water disposal system of the preferred embodiment. Although this figure shows a serpentine arrangement for the disposal systems, the invention is not so limited and those of ordinary skill in the art readily recognize a variety of other arrangement which will serve the purpose outlined herein.

Grey water 81 is received by pump 80 which is activated by the Programmable Logic Controller (not shown) or another type of controller. The grey water is communicated to solenoid valves 82A and 82B. The Programmable Logic Controller opens one of the solenoid valves allowing the grey water to pass to either leg 83A or 83B of the disposal system.

Grey water is sent into the chosen leg until sensor 84A or 84B, communicating with the Programmable Logic Controller, senses the presence of water; at which time the Programmable Logic Controller closes the appropriate solenoid valve and opens the other solenoid valve to redirect the grey water to "dry" leg of the disposal system.

This arrangement prevents any locale within the disposal system from becoming saturated and thereby damaging the area, or, in the preferred embodiment, the overlying parking lot.

Figure 9:
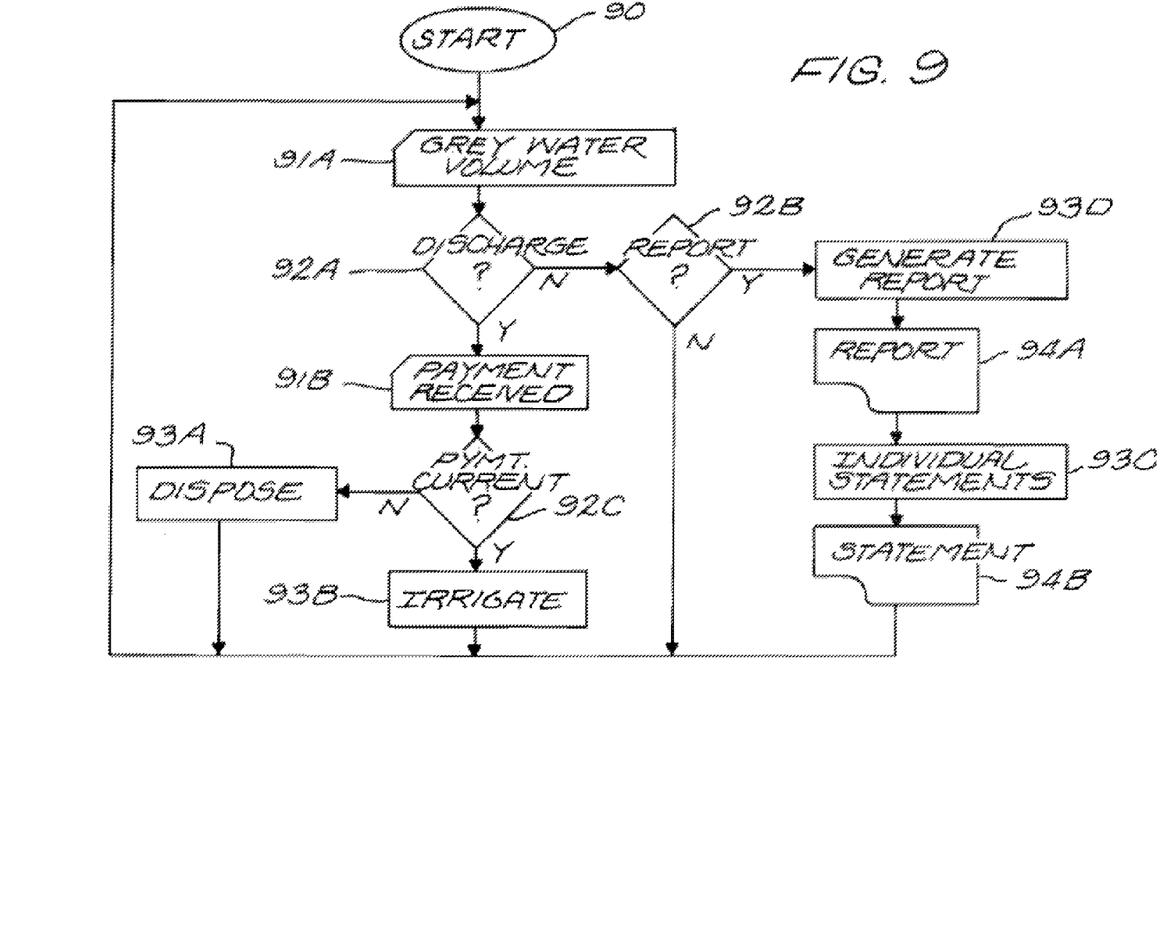
FIG. 9 is a flow chart of the preferred operation of the distributed system for the present invention.

FIG. 9 is a flow chart of the preferred operation of the base station for the distributed system described above.

Once the program starts 90, data on the grey water volume 91A within the reservoir is received. This data identifies the volume of grey water available. A determination on if there is sufficient volume within the reservoir is made 92A so that irrigation is feasible; if there is then data on the receipt of payment 91B is collected from the bank computer (described earlier). A decision on if the payment is current is made 92C which will decide if the grey water is used to irrigate 93B or if the grey water should be disposed 93A. Afterwards, the program then moves to the next system in the network and makes a similar operation and continues revolving through all of the distributed grey water collection systems.

If a discharge is not appropriate for a particular grey water collection system 92A, then a determination of if a report should be generated 92B. If no report is required, then the system again rotates on to the next grey water collection system; if a report is appropriate 92B, then a report is generated 93D, the report is communicated to the appropriate party 94A. A billing statement is generated 93C and the statement is communicated to the party 94B who is in charge of paying for the services of the local grey water collection mechanism.

It is clear from the above that the present filtering system for grey water is versatile and provides for exceptional benefits.

What is claimed is:

1. A water filtering system treating grey water contained in a reservoir for reuse, the water filtering system comprising:
   a pump in fluid communication with the reservoir;

a pressure tank in fluid communication with the pump, the pressure tank storing the grey water under pressure;

a housing having an inlet, a first outlet, and a second outlet, the inlet in fluid communication with the pressure tank, the first outlet in fluid communication with an irrigation system, the second outlet in fluid communication with a wastewater disposal system;

a first filter pair contained within the housing, the first filter pair in fluid communication with the inlet;

a second filter pair contained within the housing, the second filter pair in fluid communication with the inlet;

a first valve contained within the housing, the first valve in fluid communication between the first inlet and the first filter pair, the first valve selectively isolating the first filter pair from the inlet;

a second valve contained within the housing, the second valve in fluid communication between the inlet and the second filter pair, the second valve selectively isolating the second filter pair from the inlet;

a first anti-syphon mechanism contained within the housing, the first anti-syphon mechanism in fluid communication between the first filter pair and the outlet, the first anti-syphon mechanism preventing the grey water from flowing in a reverse manner;

a second anti-syphon mechanism contained within the housing, the second anti-syphon mechanism in fluid communication between the second filter pair and the outlet, the second anti-syphon mechanism preventing the grey water from flowing in a reverse manner;

a flow meter contained within the housing, the flow meter in fluid communication between the first anti-syphon mechanism and the outlet and between the second anti-syphon mechanism and the outlet, the flow meter generating a water volume indicia corresponding to the volume of water flowing through both the first filter pair and the second filter pair; and a third valve contained within said housing, the third valve in fluid communication between the flow meter and the first outlet and between the flow meter and the second outlet, the third valve selectively diverting the grey water between the first outlet and the second outlet.

2. The water filtering system according to claim 1 further comprising an electrical connector contained within the housing, the electrical connector for communicating electronic signals therethrough.

3. The water filtering system according to claim 2 wherein the water volume indicia generated by the flow meter is electronic, the water volume indicia being communicated via the electrical connector.

4. The water filtering system according to claim 2 wherein the third valve is a solenoid valve responsive to solenoid control signals communicated via the electrical connector.

5. The water filtering system according to claim 1 further comprising a pressure sensor monitoring the pressure within the pressure tank, the pressure sensor selectively activating the pump in response to the pressure within the pressure tank.

6. The water filtering system according to claim 1 further comprising:

a second pump in fluid communication with the first outlet;

a second pressure tank in fluid communication with the second pump, the second pressure tank storing the grey water under pressure, and an irrigation system in fluid communication with the second pressure tank.

7. The water filtering system according to claim 6, further comprising a second pressure sensor monitoring the pressure within the second pressure tank, the second pressure sensor selectively activating the second pump in response to the pressure within the second pressure tank.

\* \* \* \* \*